United States Patent [19]

Utsumi et al.

[11] 4,028,961
[45] June 14, 1977

[54] SHOCK ABSORBING STEERING ASSEMBLY FOR AUTOMOTIVE VEHICLES

[75] Inventors: Masatoki Utsumi; Munetaka Toda; Akitada Kuroda, all of Toyota, Japan

[73] Assignee: Toyota Jidosha Kogyo Kabushiki Kaisha, Japan

[22] Filed: Aug. 8, 1974

[21] Appl. No.: 495,907

[30] Foreign Application Priority Data

Aug. 30, 1973   Japan ..................... 48-101065[U]

[52] U.S. Cl. ................................ 74/492; 188/1 C
[51] Int. Cl.² .......................................... B62D 1/18
[58] Field of Search ............. 74/492, 493; 188/1 C

[56] References Cited

UNITED STATES PATENTS

| 3,538,783 | 11/1970 | Butts .................... 74/492 |
| 3,590,655 | 7/1971 | Farrell et al. ........... 74/492 |
| 3,788,148 | 1/1974 | Connell et al. ......... 74/492 |

*Primary Examiner*—Allan D. Herrmann
*Attorney, Agent, or Firm*—Toren, McGeady and Stanger

[57] ABSTRACT

A collapsible steering mechanism is structured with a pair of telescopically interfitting support tubes having a shock absorbing tube located coaxially therebetween. A plurality of bearing balls are provided on both ends of the shock absorbing tube for engagement between the support tubes with the diameter of the bearing balls being larger than the wall thickness of the shock absorbing tube to enable desired collapse of the support tubes when an impact force is applied thereto.

3 Claims, 6 Drawing Figures

SHOCK ABSORBING STEERING ASSEMBLY FOR AUTOMOTIVE VEHICLES

BACKGROUND OF THE INVENTION

The present invention relates to collapsible steering assemblies for automotive vehicles, and more particularly to an assembly wherein the steering shaft of the vehicle is mounted within a pair of telescoping support tubes which include a shock absorbing tube interposed therebetween along overlapping portions of the support tubes.

In automotive vehicles, the steering shaft which extends from the steering wheel of the vehicle is generally rotatably supported by the support tubes which are fixed to the vehicle body and which are telescopically mounted relative to each other. A support tube of smaller diameter is inserted into one end of a support tube of larger diameter with the interfitted ends of the support tubes overlapping over a portion of their lengths. A shock absorbing tube having mounted therein steering column balls is interposed between the support tubes at their overlapping portions. In the event of an automobile collision, the driver of the vehicle will collide with the steering wheel and the impact forces thus produced will cause the two support tubes to telescopically contract during collapse of the steering assembly with the shock absorbing tube body operating to lessen the shock imparted to the driver of the vehicle by impact with the vehicle steering wheel.

The steering assembly of a vehicle normally extends downwardly and forwardly from the driver compartment of the vehicle. Accordingly, when the body of the driver is driven against the steering wheel, the force of the impact thus produced upon the steering column involves a force component axially of the steering column as well as a force component which extends perpendicularly to the axial length of the steering column. In conventional shock absorbing steering assemblies, the shock absorbing tube which is interposed between the telescopically interfitted support tubes usually is structured with a wall of uniform thickness throughout. As a result, the steering column balls which are located within the shock absorbing tube will be pressed against the wall of the support tubes with an excessive force and as a result of the balls becoming imbedded in the support tubes there will occur a situation whereby the telescopic relative movement of the support tubes during collapse of the steering assembly will be impeded or prevented. As a result, the driver of the vehicle may be subjected to danger of injury from the shock which will occur upon impact with the steering wheel.

It has been found that in the case of a steering assembly mounted to extend downwardly and forwardly of the driver's compartment, when an automobile collision occurs the force of impact created by the body of the driver of the vehicle will be such that the steering column balls which are located upon the lower rearward portion and the upper forward portion of the shock absorbing tube will be forced into the supporting tubes to prevent the buffer action otherwise occurring during collapse of the supporting tubes.

The present invention is intended to provide a steering assembly which will be more likely to undergo the desired collapsing action when an impact force from the driver is imparted thereto during an automobile collision. The invention provides a shock absorbing tube body which will enable contraction without the steering balls being excessively driven into the surface of the supporting tubes even if a force acting at right angles to the axial direction of the steering shaft is created. Furthermore, the invention is arranged to operate in a manner so as to reduce the clearance which will ordinarily be provided between the interior and exterior telescoping supporting tube by appropriately structuring the shock absorbing tube which is interposed therebetween.

SUMMARY OF THE INVENTION

Briefly, the present invention may be described as a shock absorbing steering assembly for an automotive vehicle including a steering wheel and a steering mechanism, said assembly comprising, in combination, a collapsible steering shaft operably interconnected between said steering wheel and said steering mechanism, a first and a second support tube for said steering shaft, said first and second support tubes extending coaxially about said steering shaft, with the diameter of one of said tubes being larger than the diameter of the other of said tubes, said tubes being interfitted with their ends extending in overlapping relationship. The smaller diameter tube extends to within the larger diameter tube and a shock absorbing tube is coaxially interposed therebetween along the overlapping portions of said support tubes. The shock absorbing tube is structured with a pair of thicker wall portions at each axial end thereof with a thinner wall portion extending between said thicker wall portions. Bearing balls are mounted in the shock absorbing tube at both of said thicker wall portions and the balls are structured with a diameter which is larger than the thickness of the thicker wall portions. Accordingly, the balls will extend beyond the surface of the shock absorbing tube into abutment with the inner surface of the larger diameter support tube and the outer surface of the smaller diameter support tube. As a result, the support tubes may be collapsibly mounted to telescope relative to each other upon impact of a body against the steering wheel with the bearing balls coming into abutment with the surfaces of the support tubes in a manner to absorb shock but avoiding excessive interference with the collapsing action of the assembly.

In a preferred embodiment of the invention, the diameter of the bearing balls is dimensioned to be 0.1 millimeter greater than the thickness of the thicker wall portions of the shock absorbing tube.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
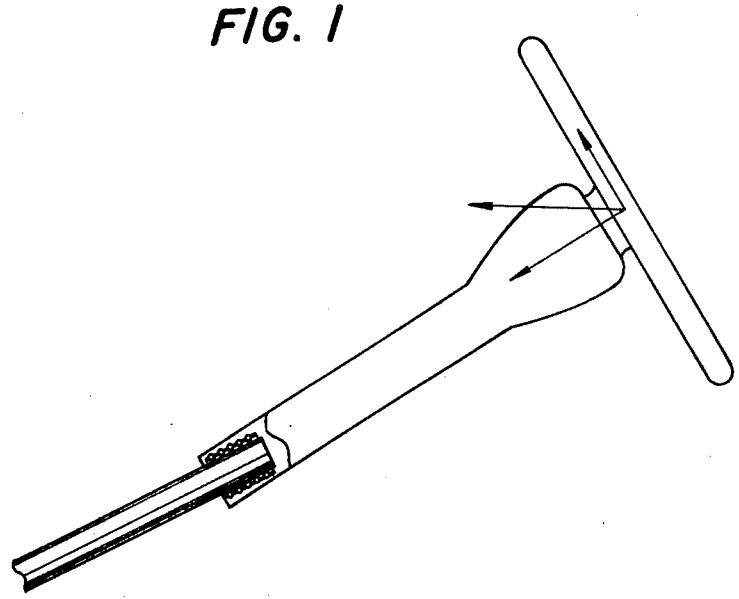
FIG. 1 is a schematic illustration of an automobile steering assembly wherein there is illustrated the action of the impact forces occurring during a vehicle collision.

Referring first to FIG. 1 wherein there is illustrated the reaction forces which occur upon the steering assembly during collision of an automotive vehicle, it will be seen that when the body of the driver impacts against the steering wheel of the vehicle, there will occur a component of force extending axially of the steering column as well as a component of force extending perpendicularly thereto. As a result, the steering column will tend to be bent out of axial alignment while at the same time having imparted thereto an axial collapsing force. As a result of the perpendicular component of force, the balls of a shock absorbing tube of conventional construction will be driven into the surfaces of the steering shaft support tubes in a manner which will restrict or inhibit the desired collapsing action of the steering column.

The structure of the present invention, which will be described in detail with reference to FIGS. 2–6 is intended to avoid or obviate the creation of forces tending to restrict or inhibit proper collapsing action of the steering column assembly.

Figure 2:
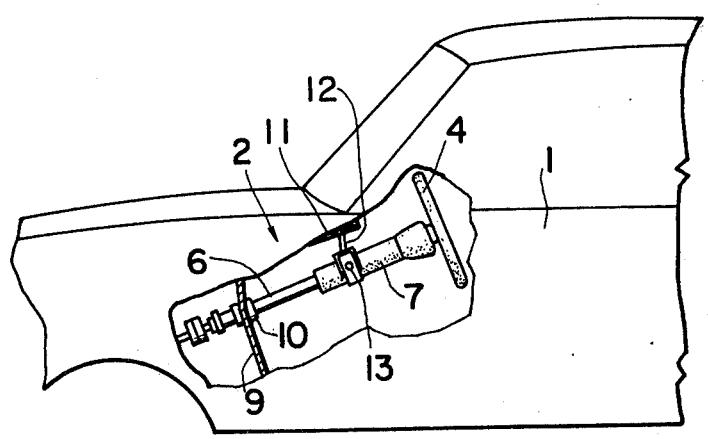
FIG. 2 is a schematic side view of a portion of an automobile with parts broken away to illustrate the mounting and location of a steering assembly in accordance with the present invention.
Figure 3:
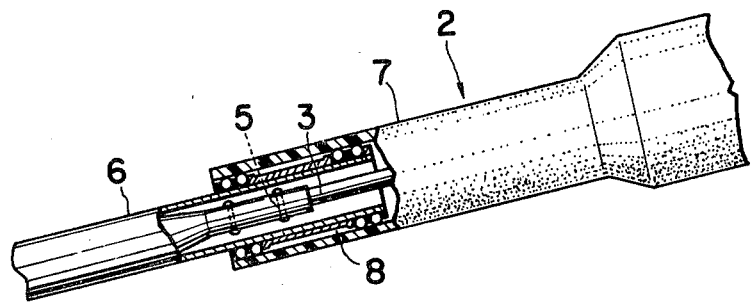
FIG. 3 is a side view partially in section showing a part of the steering assembly of the present invention.

Referring now to the drawings, and more particularly to FIG. 2, steering assembly 2 is mounted within a motor vehicle to extend in a forwardly descending direction from a driver's compartment 1 of the vehicle. A steering shaft 3, best seen in FIG. 3, extends between a steering wheel 4 located within the driver's compartment 1 and a joint located at the front end of the vehicle whereby the turning forces applied to the wheel 4 may be transmitted to a vehicle steering gear (not shown).

The steering shaft 3 consists of two shaft portions which are connected to each other in a generally telescopic manner. A shear pin 5 connects the two shaft portions of the steering shaft 3 so that they can smoothly rotate together. The shear pin 5 will be broken when an impact force acts thereupon so that the steering shaft 3 may contract or telescopically collapse during an automobile collison.

Around the steering shaft 3 there are provided a pair of supporting tubes 6 and 7 one being of a larger diameter and the other of a smaller diameter. The smaller diameter tube 6 is arranged to be inserted within a larger diameter tube 7 with the tubes overlapping over a portion of their lengths. With the tubes 6 and 7 thus assembled, the steering shaft 3 is rotatably supported therein.

Between the supporting tubes 6 and 7 there is retractably inserted a shock absorbing tube 8 which is pressed between the tubes 6 and 7 at their overlapping portions whereby the two supporting tubes 6 and 7 may be appropriately interconnected.

The small diameter supporting tube 6 is fixed through a bracket 10 on a vehicle inner wall located toward the forward lower portion of the driver's compartment 1. The larger diameter supporting tube 7 is fixed with a shear pin 13 through a bracket 12 to a forward wall 11 located within the driver's compartment 1.

When an impact force acts upon the steering assembly, the shear pin 13 will be broken and the large diameter supporting tube 7 will telescopically overlap the small diameter supporting tube 6 and as the tubes collapse one within the other shock will be absorbed by the shock absorbing tube 8.

Figure 4:
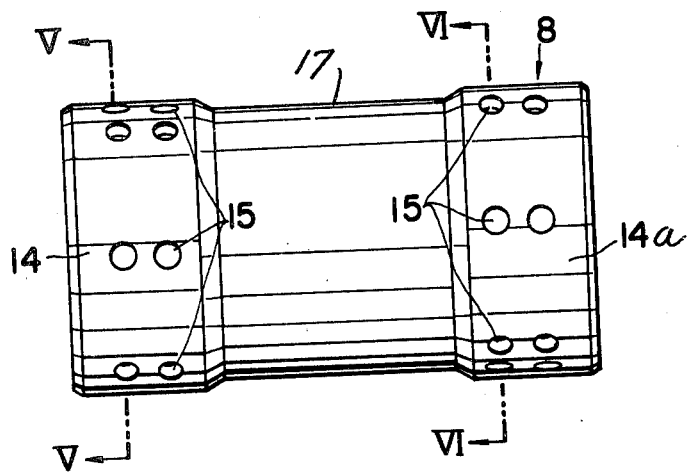
FIG. 4 is a side view showing on an enlarged scale the shock absorbing tube body of the present invention depicted in the assembly of FIG. 3.
Figure 5:
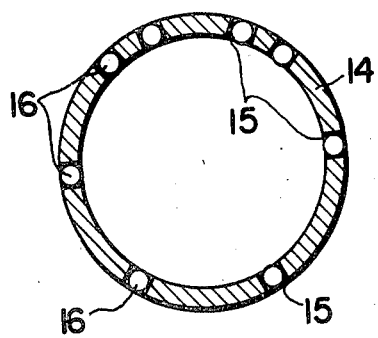
FIGS. 5 and 6 are sectional views taken, respectively, along the lines V—V and VI—VI of FIG. 4.
Figure 6:
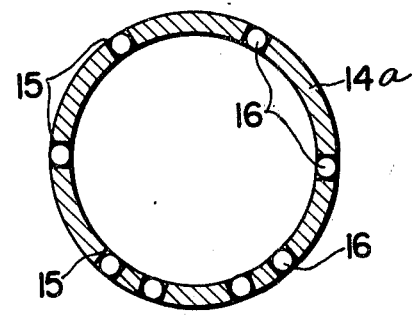

The shock absorbing tube 8 is formed with a central body 17 made preferably of synthetic resinous material and with a pair of thicker wall portions 14a located at each of the axial ends thereof. The thicker wall portions 14a are provided with through holes 15 with steering column balls 16 being inserted within each of the through holes 15. As best seen in FIGS. 4, 5 and 6, the through holes 15 are arranged in axially extending rows, with a greater concentration of through holes 15 being provided on the lower side of the rearmost portion 14a and on the upper side of the frontmost portion 14. It will be seen that at these sections of the thick wall portion 14,14a four axial rows of through holes 15 are provided, with four additional rows being spaced circumferentially about the balance of each of the thick walled portions 14,14a.

When the larger diameter supporting tube 7 moves axially relative to the tube 6, the steering column ball 16 will move relative to the tubes 6 and 7 and will make furrows on the interior or exterior walls of the tubes 6 and 7, respectively. The steering column balls 16 each have a diameter which is slightly larger than the thickness of the thick wall portions 14, 14a. Preferably, the steering column balls 16 protrude from the thick wall portions 14, 14a to about 0.1 millimeter. The balls 16 are held in place within the through holes 15, in a manner generally known, and it should be noted that the position and number of the through holes and of the steering column balls are not necessarily restricted to those illustrated in the preferred embodiment herein.

With a shock absorbing assembly structured as described herein, when an automobile is involved in a collision and the driver is caused to impact with the steering wheel 4, the shear pin 13 provided on the mounting of the large diameter support tubes 7 and the shear pin 5 provided in the steering shaft 3 will be broken and contraction of the steering column takes place. In this case, the force acting on the supporting tube 7 involves components in the axial direction as well as force components perpendicular thereto. As a result, the steering column balls 16 on the upper portion of the forward thick wall portion 14 and on the lower portion of the rearward thick wall portion 14a act so as to become forced into the exterior wall of the small diameter supporting tube 6 and the interior wall of the large diameter supporting tube 7. However, because of the thickness of the wall portions 14, 14a and the relative sizes of the balls 16, the clearance which is provided operates such that the steering column balls 16 will not be excessively forced against the surfaces of the supporting tubes 6 and 7. As a result, the supporting tube 7 having the largest diameter may move telescopically with respect to the tube 6 thereby causing the steering column to collapse without excessive scraping forces with shock being absorbed by the shock absorbing tube 8.

As described herein, where the shock absorbing tube of the present invention is utilized within the steering column, even if the component of an impact force is at right angles to the axial direction of the steering column and if such a component force acts upon the shock absorbing tube, the steering column balls are not forced into the supporting tube. When an automobile encounters a collision, the supporting tube having the larger diameter contracts securely due to proper shock absorbability and the driver will not receive harmful impact from the steering wheel.

While a specific embodiment of the invention has been shown and described in detail to illustrate the application of the inventive principles, it will be understood that the invention may be embodied otherwise without departing from such principles.

What is claimed is

1. A shock absorbing steering assembly for an automotive vehicle including a steering wheel and a steering mechanism, said assembly comprising, in combination, a collapsible steering shaft operably interconnected between said steering wheel and said steering mechanism, a first and a second supporting tube for said steering shaft, said first and second supporting tubes extending coaxially about said steering shaft, with the diameter of one of said tubes being larger than the diameter of the other of said tubes, said tubes being interfitted with their ends extending in overlapping relationship with said smaller diameter tube extending to within said larger diameter tube, a shock absorbing tube coaxially interposed between said first and second support tubes along their overlapping portions, said shock absorbing tube having a pair of thicker wall portions at each axial end thereof with a thinner wall portion intermediate said thicker wall portions, and bearing balls mounted in said shock absorbing tube at both said thicker wall portions, said balls having a diameter larger than the thickness of said thicker wall portions to extend beyond the surface of said shock absorbing tube into abutment with the inner surface of said larger diameter support tube and the outer surface of said smaller diameter support tube whereby said support tubes may be collapsibly mounted to telescope relative to each other upon impact of a body against said steering wheel.

2. An assembly according to claim 1 wherein the diameter of said balls is 0.2 millimeter greater than the thickness of said thicker wall portions of said shock absorbing tube.

3. An assembly according to claim 1 wherein said vehicle includes a forward end and a driver's compartment located rearwardly of said forward end, with said steering assembly extending from within said driver compartment with a directional component forwardly of said vehicle, and wherein the distribution of said balls on said shock absorbing tube is such that a greater number of said balls are located on the lower side of the rearmost thicker wall portion and on the upper side of the forward-most thicker wall portion than at other portions of said shock absorbing tube.

* * * * *